(12) United States Patent
Herz et al.

(10) Patent No.: US 9,100,726 B2
(45) Date of Patent: Aug. 4, 2015

(54) SELECTION AND DISTRIBUTION OF SECOND DIGITAL CONTENT TO REMOTE DEVICE USING APPLICATION EMBEDDED IN FIRST DIGITAL CONTENT PACKAGE

(75) Inventors: Justin Herz, Los Angeles, CA (US); Kim Lau, Burbank, CA (US); Bradley Collar, Valencia, CA (US); Massimiliano Gasparri, Los Angeles, CA (US); Randy Lee, La Crescenta, CA (US); Patrick Harman, Moor Park, CA (US)

(73) Assignee: WARNER BROS. ENTERTAINMENT, INC., Burbank, CA (US)

(*) Notice: Subject to any disclaimer, the term of this patent is extended or adjusted under 35 U.S.C. 154(b) by 940 days.

(21) Appl. No.: 12/533,861

(22) Filed: Jul. 31, 2009

(65) Prior Publication Data
US 2010/0085857 A1  Apr. 8, 2010

Related U.S. Application Data

(60) Provisional application No. 61/085,311, filed on Jul. 31, 2008.

(51) Int. Cl.
| | |
|---|---|
| *H04N 5/84* | (2006.01) |
| *H04N 21/858* | (2011.01) |
| *H04N 21/41* | (2011.01) |
| *G11B 20/00* | (2006.01) |

(52) U.S. Cl.
CPC ........ *H04N 21/858* (2013.01); *G11B 20/00862* (2013.01); *G11B 20/00869* (2013.01); *H04N 21/4126* (2013.01); *H04N 21/4135* (2013.01); *G11B 2220/2537* (2013.01); *G11B 2220/2541* (2013.01)

(58) Field of Classification Search
CPC ................. G11B 2220/2541; G11B 20/00862; G11B 20/00869; H04N 21/4126; H04N 21/4135; H04N 21/858
USPC .................................................. 386/334–342
See application file for complete search history.

(56) References Cited

U.S. PATENT DOCUMENTS

| | | | | |
|---|---|---|---|---|
| 5,941,648 | A * | 8/1999 | Robinson et al. ............... | 400/82 |
| 7,308,420 | B1 | 12/2007 | Storch et al. | |
| 7,561,072 | B2 * | 7/2009 | Pham .............................. | 341/23 |
| 8,060,631 | B2 * | 11/2011 | Collart et al. ................. | 709/229 |
| 2002/0013774 | A1 * | 1/2002 | Morimoto ........................ | 705/80 |
| 2002/0120936 | A1 * | 8/2002 | Del Beccaro et al. .......... | 725/61 |

(Continued)

*Primary Examiner* — Gelek W Topgyal
(74) *Attorney, Agent, or Firm* — Jonathan Jaech; Snell & Wilmer L.L.P.

(57) ABSTRACT

A media (e.g., Blu-Ray) first content package includes a link to an application for sending second content to a remote device, especially a mobile telephone. The application is included in the first content. The second content is not included in the first content. The application presents a list of second content choices, selectable by a user. The application receives a destination address for the second content from user input and sends the destination address to a second content server. The second content server contacts the remote device having the indicated destination address, and confirms that receipt of second content will be accepted. Upon receiving confirmation, the second content server transmits the second content to the remote device. The technology may be used to provide content to mobile devices, such as mobile phones, in association with distributed media such as Blu-Ray discs configured for being played by a media player.

27 Claims, 7 Drawing Sheets

(56) References Cited

U.S. PATENT DOCUMENTS

| | | |
|---|---|---|
| 2003/0056212 A1 | 3/2003 | Siegel et al. |
| 2004/0096043 A1* | 5/2004 | Timmins et al. ........... 379/88.22 |
| 2004/0109087 A1 | 6/2004 | Robinson et al. |
| 2004/0181531 A1 | 9/2004 | Becker |
| 2004/0186768 A1* | 9/2004 | Wakim et al. ................... 705/14 |
| 2006/0174316 A1 | 8/2006 | Gregorian et al. |
| 2006/0190320 A1 | 8/2006 | Dewa |
| 2006/0215988 A1 | 9/2006 | Tol et al. |
| 2007/0125620 A1 | 6/2007 | Sorenson et al. |
| 2008/0071834 A1* | 3/2008 | Bishop ...................... 707/104.1 |
| 2008/0270251 A1* | 10/2008 | Coelho et al. ................... 705/26 |
| 2009/0150553 A1* | 6/2009 | Collart et al. ................. 709/229 |
| 2010/0125495 A1* | 5/2010 | Smith et al. ................ 705/14.23 |
| 2010/0293598 A1* | 11/2010 | Collart et al. ..................... 726/3 |
| 2011/0302258 A1* | 12/2011 | Huynh et al. .................. 709/206 |
| 2012/0030366 A1* | 2/2012 | Collart et al. ................. 709/229 |

\* cited by examiner

| | | 402 |
|---|---|---|
| FUN + GAMES | WEBISODES | |
| VENGEANCE AND VALOR | PLAY ALL | |
| BLUESCREEN PICTURE-IN-PICTURE VERSION | PRODUCTION DESIGN | RODRIGO SANTERA |
| | WARDROBE | TRAINING THE ACTORS |
| ☐ ON  ☒ OFF | STUNT WORK | CULTURE OF THE SPARTAN CITY/STATES |
| | TEAM HISTORY | A GLIMPSE FROM THE SET |
| PICK YOUR FAVORITE SCENES | ADAPTING THE GRAPHIC NOVEL | SCENE STUDIES FROM 300 |
| | GRAD BUTLER | FANTASTIC CHARACTERS OF 300 |
| | ADDITIONAL FOOTAGE | |
| BEHIND THE STORY | DELETED SCENE | |
| | WEB-ENABLED FEATURES | |
| THE 300 - FACT OR FICTION? | MOBILE DOWNLOADS: WALLPAPER & RING TONES | |
| WHO WERE THE SPARTANS? | | |
| PREPARING FOR BATTLE | iWEBISODES | |
| FRANK MILLER TAPES | | |
| MAKING OF 300 | [CLOSED] | |
| MAKING 300 IN IMAGES | PRODUCTION DESIGN | |
| PAUSE MOVIE  SETTINGS | SCENE SELECTIONS | SPECIAL FEATURES  ✕ |

SELECTION AND DISTRIBUTION OF SECOND DIGITAL CONTENT TO REMOTE DEVICE USING APPLICATION EMBEDDED IN FIRST DIGITAL CONTENT PACKAGE

CROSS-REFERENCE TO RELATED APPLICATION

This application claims priority pursuant to 35 U.S.C. §119 (e) to U.S. provisional application Ser. No. 61/085,311, filed Jul. 31, 2008, which is hereby incorporated by reference, in its entirety.

BACKGROUND

1. Field

The present disclosure relates to a system and method for providing electronic content to distributed devices.

2. Description of the Related Art

Motion picture feature films and similar audio-visual digital content is often distributed as a package of digital content formatted for play by a specialized player according to a specific standard. For example, movies, television episodes, and similar content are often encoded as digital data on optical media such as DVD, HD DVD or Blu-ray discs, and distributed in packages of one or more discs. Each digital content package may consist of a specific set of binary files formatted according to an applicable audio or video codec, representing various parts of an interlinked media presentation when played by the appropriate media player. For example, one file may be played to present a feature film, while other files are played to present various menus and special features on a consumer display device, such as a video monitor. All of the files are characteristically configured to be playable using a media player compliant with a specific standard, which specifies various video or audio codecs, for example, MPEG-2, MPEG-4 AVC, SMTPE-VC1, Linear PCM, and Dolby Digital. Supported codecs require limitations on the digital content that is to be played, and data or executable files that do not comply with a supported codec cannot generally be played using a standard media player. Information concerning the DVD and HD DVD standard is available from the DVD Forum at www.dvdforum.org, although the HD DVD standard is no longer supported. Information concerning the Blu-ray standard is available from the Blu-ray Disc Association at www.blu-raydisc.com.

Digital content packages formatted to specific DVD, HD DVD or Blu-ray standards are usually provided on a physical media, such as an optical disc. These standards were specifically developed for optical media, and are designed to provide a specified data density for media compliant with the applicable standard, among other things. Digital files encoded on media complaint with these standards, in turn, must comply with published video or audio codecs specified by the applicable standard. It should be appreciated that a digital content package consisting of files that comply with all requirements of a particular standard may be encoded on other media besides an optical disc medium. Such a digital content package may be streamed via a wide area network, wirelessly broadcast, and/or stored on a variety of different computer memories, while retaining all the characteristics of a compliant content package, including consistent adherence to specific audio-video codecs for encoding of audio-video data, and strict avoidance of executable or other data not compliant with the applicable standard. Such characteristics make the compliant digital content package suitable for use by any compliant media player to provide audio-video output.

Many users also own and operate player devices that are not compliant with the same applicable data standard as used for encoding the digital content package. For example, many consumers own a Blu-ray player connected to their home or portable video monitor, and also own a cell phone, personal digital assistant, portable game player, or similar portable device that, although having a video display capability and audio output capability, is unable to play Blu-ray content packages. As compared to the older DVD standard, the Blu-ray standard provides the advantage of built-in support for network connectivity features.

Therefore, it would be desirable to provide a method or system for providing content in connection with a digital content package, such as a Blu-ray disc or comparable article containing digital content encoded on a medium according to a network-supported optical disk format, that overcomes these and other limitations of the prior art.

SUMMARY

The present technology, therefore, provides a system and method whereby an end user may use a first digital content package configured for play on a first device to obtain second content configured for play on a second device, wherein the second device cannot play the first content, and the second content is not included in the first content.

A system with these capabilities may comprise a first device configured to connect to a server via a computer network, and including an optical disc player, for example, a Blu-ray player. In some embodiments, the first device may consist of a special-purpose Blu-ray player configured to read content formatted according to the Blu-ray standard from an optical medium and produce an audio-video signal for a display device. In the alternative, or in addition, the first device may be configured to read an optical or other medium containing data formatted according to an alternative standard to produce the audio visual signal. The first device may further comprise a controller capable of receiving a signal from a user input device, such as, for example, a remote control, and executing a program read from the optical medium to generate responsive output. The first device may further comprise a network interface in communication with the controller. The first device may be configured to produce the audio-visual output as high-bandwidth digital audio and video content for output to a DisplayPort, Digital Visual Interface (DVI), High-Definition Multimedia Interface (HDMI), Gigabit Video Interface (GVIF), or Unified Display Interface (UDI), or other suitable high-bandwidth output port.

In some embodiments, first device is configured to operate in the manner described herein using software encoded on the same optical medium article as contains the audio-visual content for output. In such embodiments, operation of the first device as described herein may be enabled only when the medium (e.g., an optical disc) resides inside a media reader device integrated with or connected to the first device. In the alternative, or in addition, the software may be downloaded to a writable memory of the first device from a remote location accessed via the network interface, in response to loading of a specific medium into the first device. In either case, the capability of the first device to direct the second content to a second device may be conditioned on the first device having access to the first digital content package.

The system may further comprise a remote server responsive to signals from the first device to direct the second content to the second device. The first device operates under control of the software to allow input or other designation of an address (e.g., email address or telephone number) for the second device. The first device may communicate the address of the second device to the remote server. The first device may also communicate a request to the remote server for directing the second content to the second device using the designated address. The remote server may, in response, obtain the second content from a data storage device and direct the second content to the second device. Upon receiving the second content, the second device may store the second device in a local memory for audio or video output.

Optionally, the second content may bear some thematic relationship to the first content. For example, the first content may comprise a feature motion picture, while the second content may comprise a background image for a cellular phone display showing a scene from the motion picture, or a ringtone based on a tune used in the motion picture. In this way, users may purchase or receive free of charge additional content that is reminiscent of the motion picture. Optionally, the second content may be made exclusively available through the first content. Further details and features of the present technology are described in the detailed description that follows.

DESCRIPTION OF DRAWINGS

In the detailed description that follows, like element numerals are used to describe like elements appearing in one or more of the figures.

DETAILED DESCRIPTION

Figure 1:
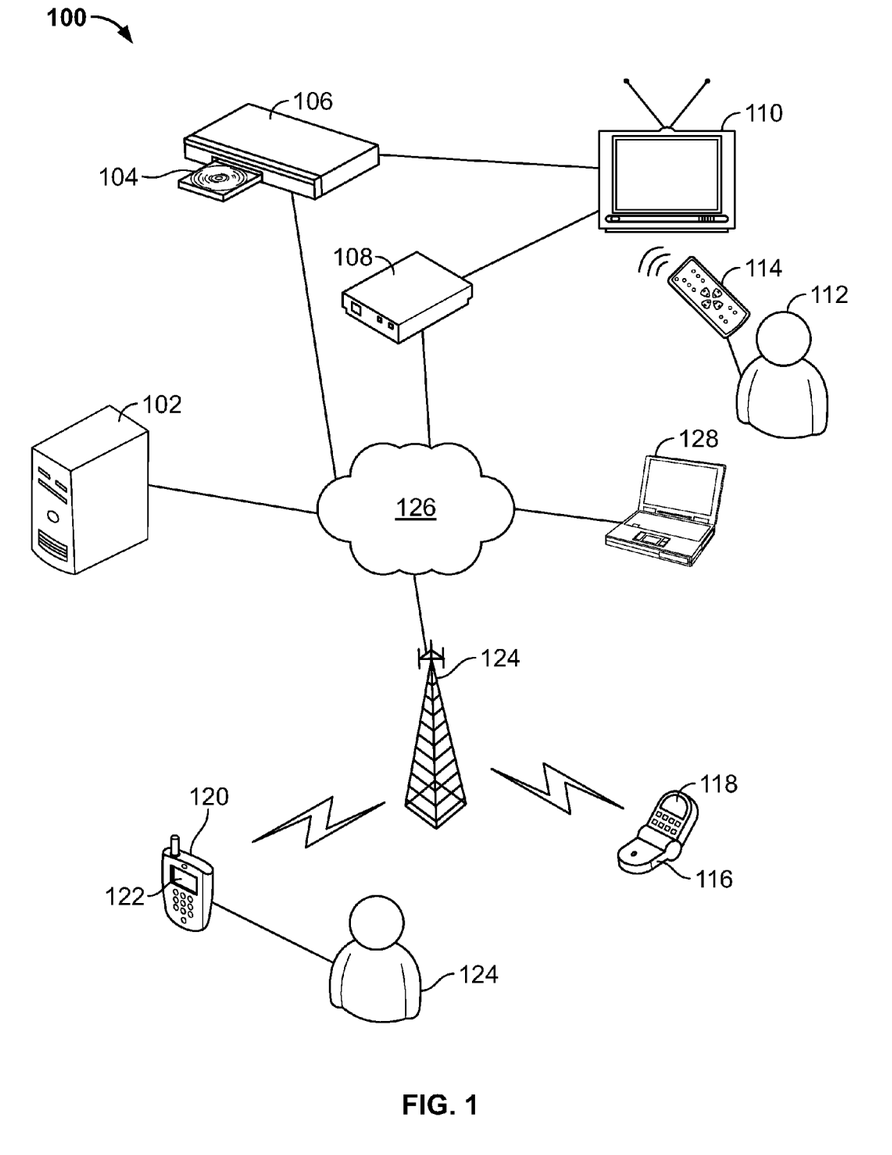
FIG. 1 is a system diagram showing various exemplary elements of a system 100 in which methods described herein may be performed, or applications as described herein may operate.

Referring to FIG. 1, system 100 may comprise a remote content server 102 hosting second content referenced via an application included in a first digital content package. The first digital content package may be encoded on a specific media according to an applicable standard for digital audio video data, for example, on an optical disc media 104 for play in a compatible media player 106 located remotely from the server 102 to provide audio-video output. As mentioned already, suitable standards capable of supporting network connectivity may include, for example, HD DVD and Blu-ray. In the alternative, or in addition, the first digital content may be encoded in some other medium or device, such as magnetic media or USB memory device, accessible to player 106. Yet another alternative is to broadcast or stream the first digital content package from a network source (not shown) to a remotely located set-top box 108, which may cache the first digital content package for local playback. Either or both of the media player 106 or set-top box 108 may be connected via a wired or wireless connection to an audio-video output system 110, for example, a television monitor with integrated audio amplifier and speakers. The audio-video output system 110 may be viewed by a user 112. Using a remote control 114 or other suitable user input device, the user may provide control feedback to a relevant one of the media player 106 or set-top box 108, controlling play of the audio-video content encoded in the first digital content package. Similarly, a user 112 may provide input to an application (to be described further herein) included in the first content and operating on the media player, for causing second content to be distributed to a second output device.

By way of example, various second output devices are depicted in system 100 as destination devices for the second content. For example, a second output device may include a cellular telephone 116 having a video display screen 118 and internal memory for digital content storage. For further example, a second output device may comprise a personal digital assistant 120 (PDA) with a wireless Internet interface, also having a display screen. In the exemplary system, the PDA 120 may be operated by a second user 124 while the cellular telephone 116 may be operated by the first user 112. Phone 116 and PDA 120 may be connected to a wide area network 126 via one or more wireless networks 124. A computer 128 may be operated by user 112 or any other user, and may also be connected to WAN 126. Computer 128 may be used by a user to access an electronic commerce site operated by second content server 102 configured for managing commerce in second content. All of the destination devices may play received second content to provide audio/visual for the enjoyment or other use of the device user.

Server 102 may be in electronic communication with player 106 or set-top box 108 via WAN 126. In the alternative, or in addition, the player 106 or set-top box 108 may communicate with server 102 through a dial-up telephone line, cable network, satellite network, or other communications network. Generally, one second content server may be in communication with a large plurality of first content players 106, 108 for different users and ancillary devices 116, 122 and 128 for receiving second content.

Figure 2:
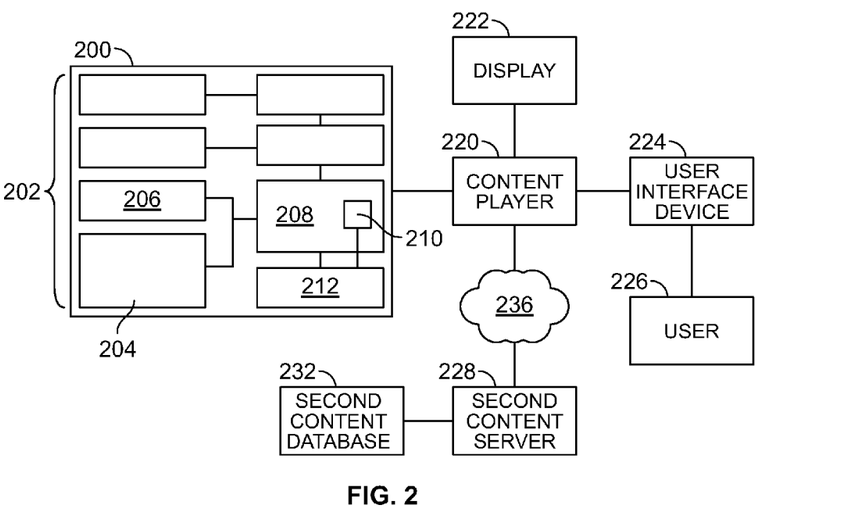
FIG. 2 is a block diagram showing an exemplary first content package in more detail, in combination with selected system elements that interact with the first content package.

Within an exemplary system 100, a first content package 200 as shown in FIG. 2 may be produced and delivered to a media player for an applicable audio-video standard. As permitted by the HD DVD and Blu-ray standards, the first content package may comprise a plurality of interlinked files 202, for example a main feature file 204 and root menu file 206. These files may also include a special features file 210 having a link to a special application 212 for requesting second content. Special application 212 may be coded in an application compatible with the applicable media player. For example, for use with a Blu-ray player, application 212 may be coded in Java ME. Set-top boxes may also be programmed to provide the network connectivity and interactive features as described herein, and may be coupled with Digital Video Recording capability for storing first content packages transmitted to the set-top box from a computer network, cable network, or digital broadcast source.

First content 200 when played on content player 220 may cause a menu to appear on display 222. The displayed menu may include a link 210 inviting the user to select second content for transmission to a second device, which may be any network-accessible device capable of receiving the second content. For example, the displayed menu may invite the user to select ringtones or a wallpaper graphics file to be delivered to a cellular telephone device. The user 226 may select the link via a user interface device 224 in communication with player 220, for example, a remote control device with directional keys and an "enter" or "select" button. When the link is thus selected using the interface device, application 212 may operate in response to selection of the link, causing a second menu of available second content to appear. The second content is not included in first content 200, although a list or description of the second content may be included in the first content. In the alternative, the list or other description of the second content is not included in the second content, and the application 212 may obtain the list or other description from the second content server 228 or other network source via a connection through a WAN 230, telephone dial-up, cable network, or other network.

A second content menu may thereby be caused to appear on display 222 in response to input from interface device 224 indicating user selection of a link 210 embedded in the first digital content package 200. The second content menu may itself be provided with further links each responsive to input from the user interface device 224. It may be advantageous to provide a preview or sample of the second content in association with the second content menu. For example, the second content menu may be configured to display or link to thumbnail images of graphic images, excerpts of textual works, or audio files for ringtones or music samples. Such samples may be obtained by application 212 from the second content server in response to input indicating user interest in a particular item of the second content.

Such samples, however, are formatted for output using the content player 220, and as such, may be different in format than the actual second content offered for selection on the second content menu. For example, a second content text sample provided by the second content server to the content player 220 may be provided as an MPEG or JPEG still image, for an electronic book that is available to be distributed from the second content server to an electronic book reader in any one of several non-graphic file types used by such readers. Other sample content may be of the same file type as the actual second content, but formatted for a different screen size or audio driver. In general, the second content is produced specifically for reception devices that are of a different type than the content player, and that are not generally capable of handling the same data as the content player 220.

In response to further user input received via interface device 224, application 212 may cause the content player 220 to transmit data to second content server 228 indicating user selection of one or more items of digital second content. In response to receiving such selection data, the second content server may obtain a selected item of content from a second content database 232 for transmission to an indicated destination device, excluding the content player 220. The second content server may, prior to transmitting the content to the indicated address, send a confirmation message to the destination device, requesting confirmation that transmission to the device is desired. If the second content server receives a message back from the destination indicating that transmission of the second content is desired, the second content server may initiate transmission of the second content to the specified destination device. If the second content server does not receive a message back from the destination device, or receives a message refusing transmission of the second content, the second content server may cancel transmission of the second content to the destination device. Optionally, the confirmation message sent to the destination device may state that a user account will be debited if the content transmission is accepted. In such case, after successfully completing a transmission of second content to the destination device, the second content server may initiate a debit of the appropriate user account.

Either before or after a user indicates interest in obtaining a specific item of second content to be delivered to some ancillary device (e.g., PDA 122 or cell phone 116 shown in FIG. 1), application 212 may operate to obtain or confirm an address for one or more destination devices for the second content. For example, the application may display an interactive interface in response to user selection of second content, allowing the user to enter a destination address, such as a telephone number or email address. The interactive interface may be configured to permit user selection and correction of alpha-numeric characters using the user interface device 224, and the application may assemble and display the telephone number or other address as it is entered. Once an entire address has been entered and the application has received a confirmatory input from the user via the user interface device, the application may transmit the telephone number or other address to the second content server. In the alternative, or in addition, the second content server may maintain one or more destination addresses for each or a plurality of user accounts. Application 212 may identify the user via an interactive user login interface, cookie file stored in content player 220, credit card information, or other means, and provide a user identifier to the second content server. In response, the second content server may provide one or more stored destination addresses for the indicated user to the content player 220 and application 212 may cause the available addresses to be displayed for user selection in an appropriate interface screen. Application may then transmit data to the second content server indicating which address or addresses are selected by the user, in response to receiving selection input from the user interface device 224.

Optionally, the second content server may maintain separate accounts for each user that requests second content via a content player playing first digital content packages. Such accounts may be accessed via a web interface in a conventional fashion. The web interface may be configured to allow users to purchase or select additional second content, view account records of past activity, pay account balances, indicate addresses for destination devices to receive second content, obtain and manage customer loyalty points, and generally provide electronic commerce services associated with providing the second content.

One of the advantages of the present technology is the ability to allow marketing of digital content that is thematically related to a specific motion picture, dramatic series, or other item of recorded audio-video entertainment, in direct association with the related information content itself. Such thematically related digital content may include, for example, theme music, movie sound tracks, photo clips, video clips, ringtones, electronic books, and video games. It is believed that presenting the opportunity to obtain thematically related content directly during play of a first digital content package will enhance convenience for users and promotional opportunities for content providers. In addition, the opportunity for receive second content for free, or for a reduced fee, may be used to promote sales and distribution of the first digital content packages, such as HD DVD and Blu-ray discs.

Figure 3:
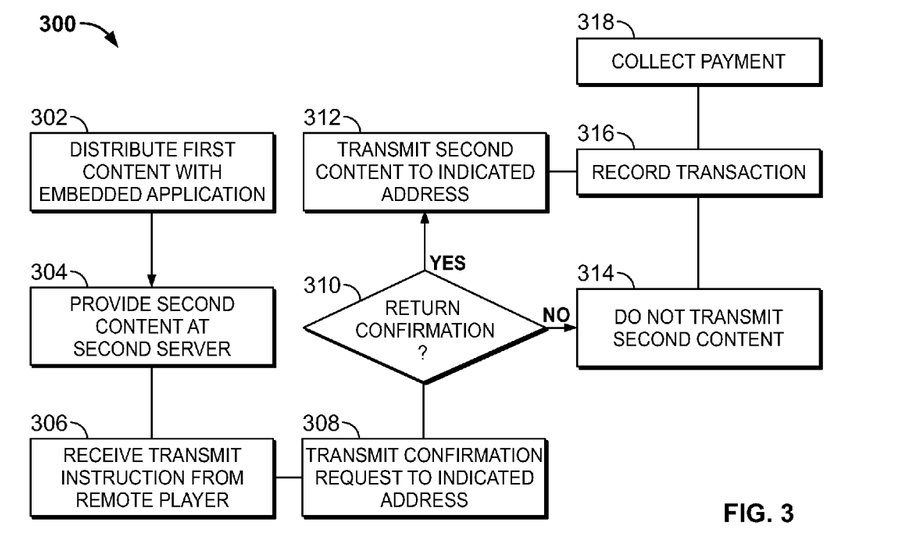
FIG. 3 is a flow chart showing exemplary steps of a method for distributing second content to second devices initiated through first content playing on a media player.

In accordance with the foregoing, FIG. 3 shows exemplary steps of a computer-implemented method 300 such as may be implemented by a second content server of the foregoing systems in cooperation with other system elements as already described. Steps of method 300 and related actions may be implemented in a computer by coding appropriate instructions in a computer language. Resulting executable code comprising one or more applications may be encoded on a computer-readable medium and used to cause a computer to perform the related steps and actions.

Prior to activity at the second content server, a first digital content package with an embedded application may be distributed 302 to one or more specialized media players, for example, HD DVD or Blu-ray players, or a set-top box configured for digital video content. Production of the first digital content package and embedded application may be in accordance with the foregoing disclosure, and the application should be configured to operate on the intended media player in the manner described herein. The first content may be distributed on physical media such as optical disks, or transmitted for storage or caching on a local memory device accessible by the media player device.

In coordination with distribution of the first digital content, second content may be provided 304 in a data storage device accessible to the second content server. The second content should be developed and provided to match any second content links already provided in the embedded application distributed in the first digital content package. This may include, for example, ensuring that the application will operate as intended on the media player to provide links to all second content provided on the second content server. To this end, it may be advantageous to configure the second server to provide the embedded application with an updated list and description of the second content whenever queried by the embedded application. In the alternative, or in addition, the first digital content package may be configured to include a list and descriptions of available second content, which is then provided at the second server. Similar considerations may apply to data samples of second content as previously discussed.

The second content server may be operated with a connection to a WAN or other communication network, configured to receive 306 transmit instructions from an embedded application operating on a remote media player. As previously discussed, the second content server may further be configured to transmit and receive other data with the embedded applications on remote media players, including but not limited to account identifiers, device identifiers, sample data, list or description data, use records, transaction records, or purchase data. As used above, "transmit instructions" refers to data from a remote media player specifying at least specific second content to be transmitted, and an address for a destination device excluding the remote media player to which the second content is to be transmitted.

At 308, the second content server may transmit a request for confirmation to the destination device indicated in the instructions from the remote media player. The second content server may assess a response to the confirmation request 310, transmitting the second content to the indicated address 312 only if a return confirmation of acceptance is received from the destination device. Conversely, if no return confirmation is received, the second content server may cancel transmission 314 of the second content. At 316, the second content server may record the transaction details 316, including an identifier for the transmitted second content, date and time of transmission, status of transmission, destination address, and account identifier. Periodically, or in response to queries, the second content server may provide reports of transactions and transaction details. Optionally, the second content server may collect payment for completed content transmissions as known in the art. Method 300 may be performed concurrently for a plurality of transmission requests from different media players to distribute second content to a plurality of different destination devices. Once received by the destination device, the second content may be played to provide intended audio/visual output for the device user.

Figure 4:
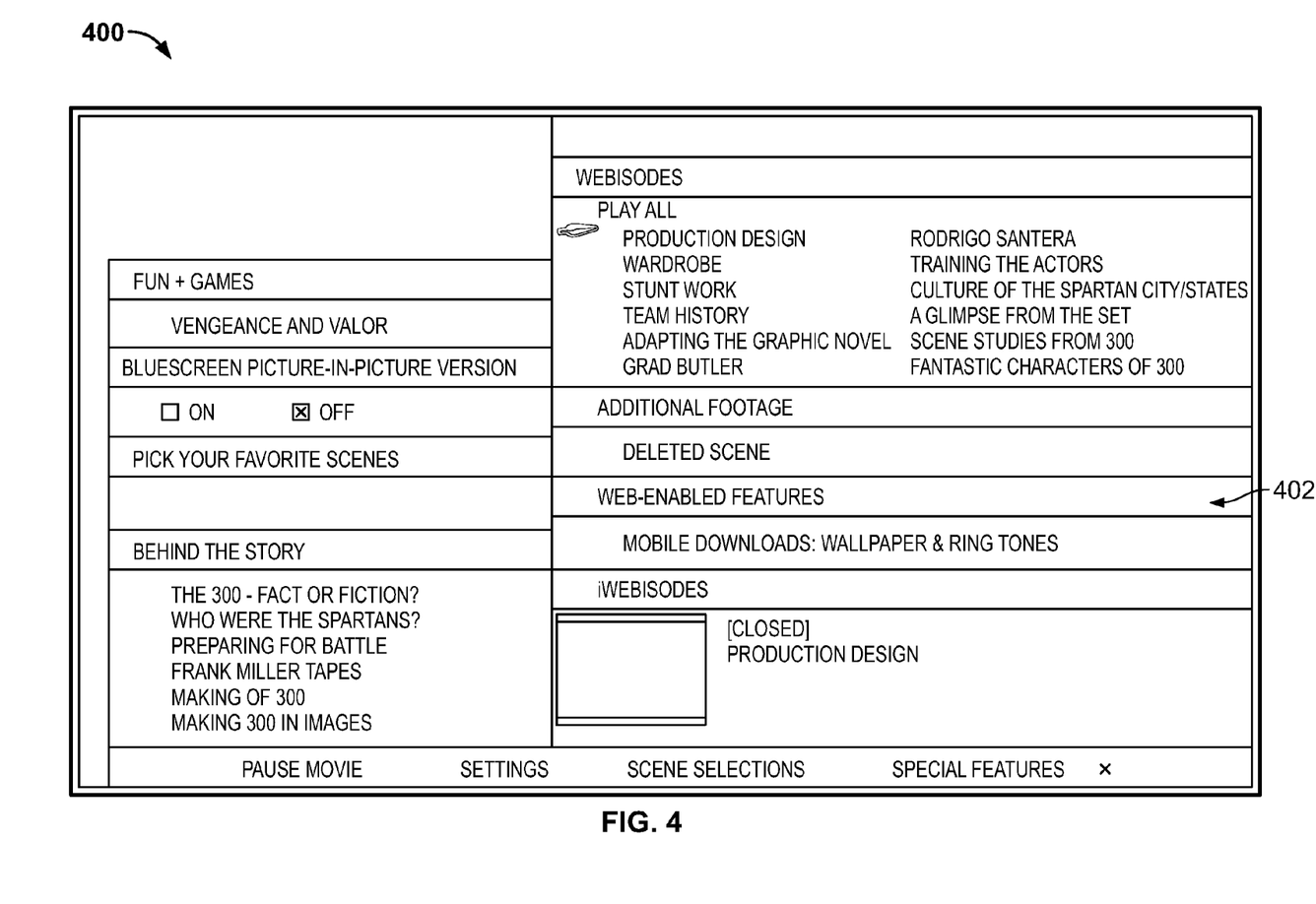
FIG. 4 is a screenshot showing an exemplary special features application menu page of a media player screen for enabling access to a second content application for providing second content to a remote mobile telephone.
Figure 5:
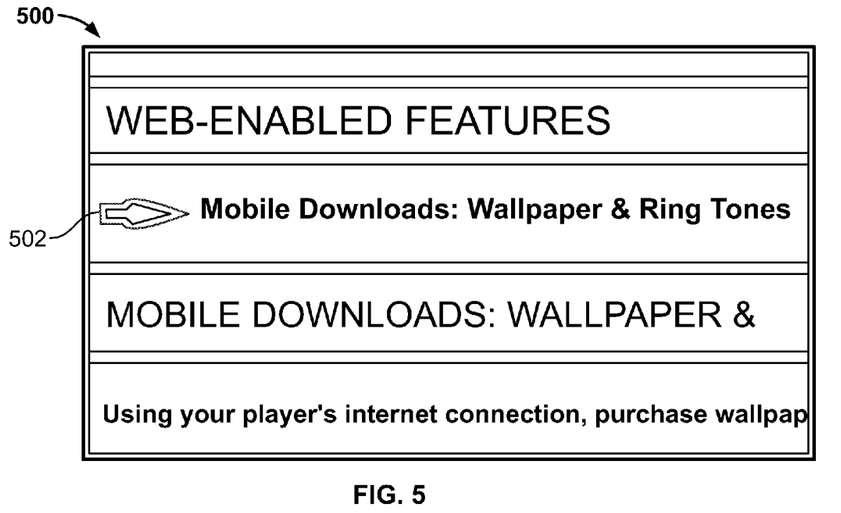
FIG. 5 is a close up screenshot showing an exemplary interactive button displayed on the media player screen to access the second content application.
Figure 6:
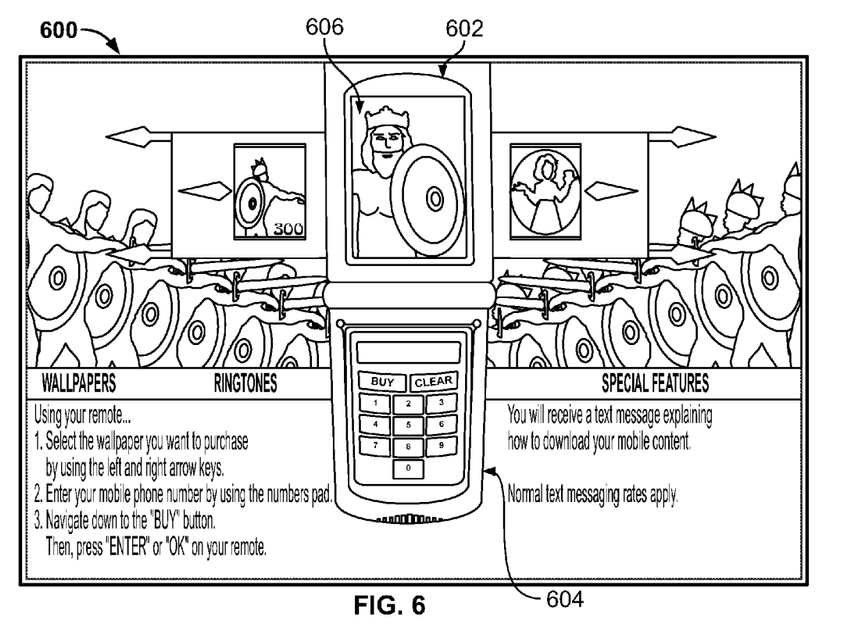
FIG. 6 is a screenshot showing an exemplary media player screen for selecting second content and indicating an address for the destination device, in this example a telephone number for a mobile telephone.

Aspects of the present technology are further apparent in the accompany FIGS. 4-10, showing exemplary screenshots of a media player and mobile device at different times during and after performance of a second content selection method at a media player. Referring to FIG. 4, the second content application operating on the media player may display a special features application menu page 400 of a media player screen for enabling access to a second content application for providing second content to a remote mobile telephone. One of the choices on the menu screen in "Web-Enabled Features" 402. This entry is shown in more detail in FIG. 5, showing an exemplary interactive button 502 displayed on the media player screen 500 to enable viewer access to the second content application. Once this button is activated, the second content application may display a screen for selecting second content and indicating an address for the destination device, as shown in FIG. 6. In the present example, the address will be a telephone number for a mobile telephone. Accordingly, the user-friendly screen 600 depicts an interactive image of a mobile telephone including an interactive keypad 604. When a user selects a content item, for example, a screen wallpaper image, the sample may be displayed in the simulated mobile telephone display 606.

Figure 7:
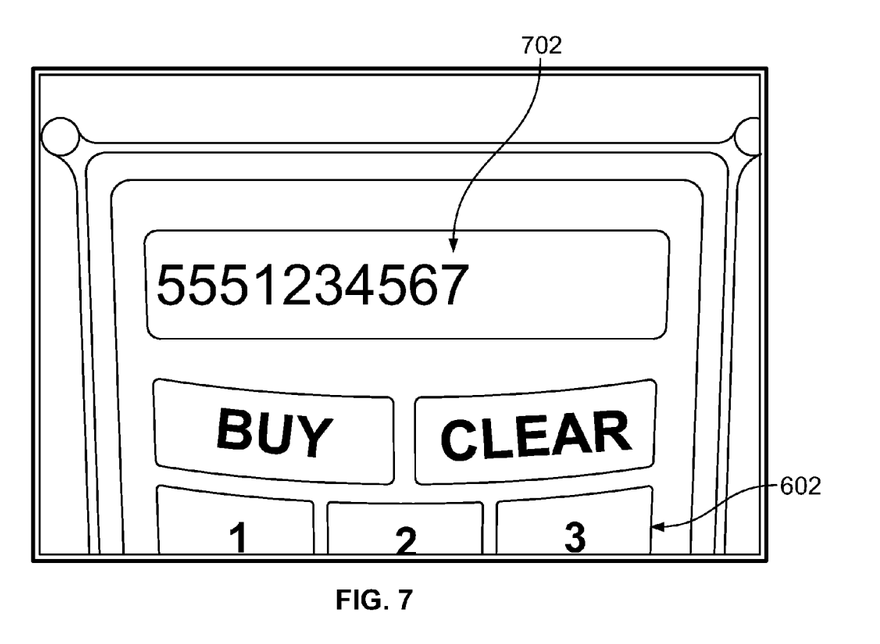
FIGS. 7-9 are close up screenshots showing details of an exemplary media player screen at different times during an interactive process for designating a destination device for second content.
Figure 8:
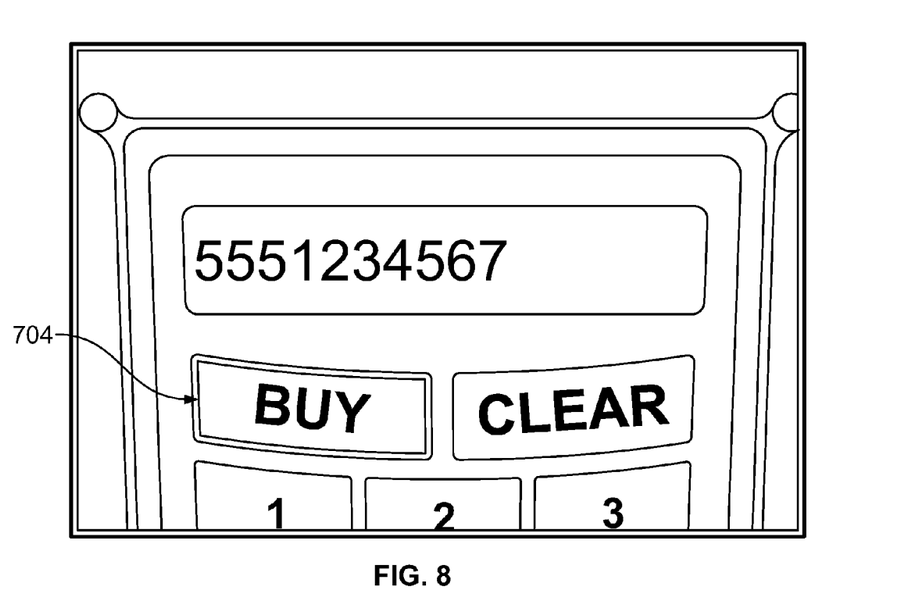
Figure 9:
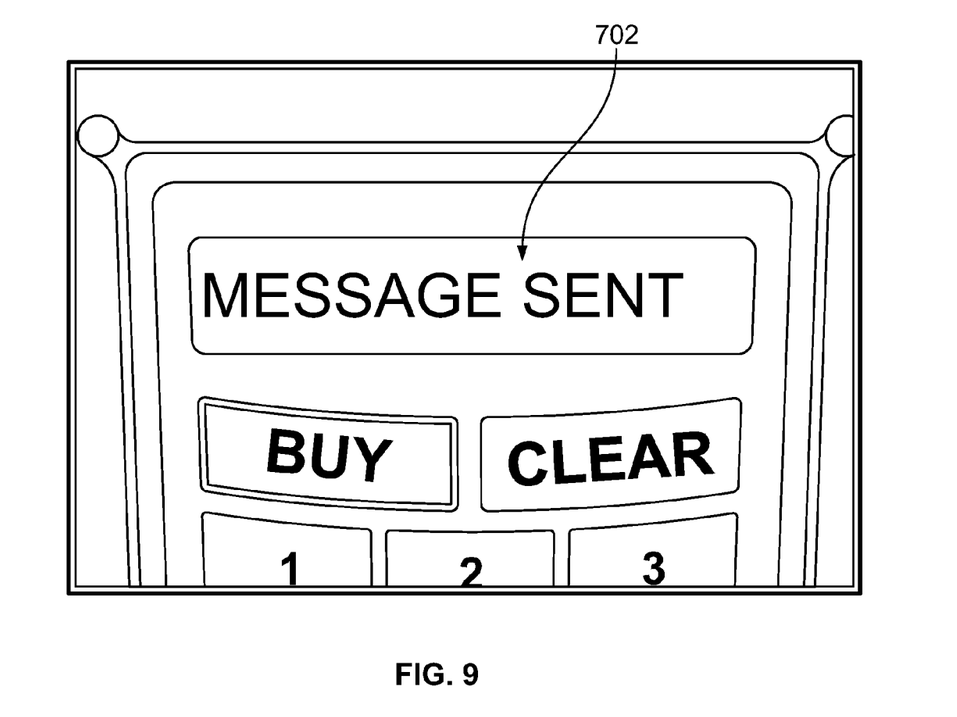

Once the user has selected a second content item, the application may receive user input specifying a destination address, as shown in FIGS. 7-9. At FIG. 7, the user may enter a destination address, in this case a telephone number, using the simulated keypad 604. Characters selected by the user are displayed in the number bar 702. This entry process may simulate number entry on a mobile device, so as to be familiar in feel to the viewer. After a desired address number is entered, the user may select a "buy" icon 704, which may be highlighted as shown in FIG. 8. In response to receiving the "buy" signal via a user interface, the second content application operating on the media player may transmit the request for delivery of selected second content to the entered address to the second content server. After successfully transmitting the request, the second content application may display a confirming message, for example, "message sent," in the number bar 702, as shown in FIG. 9. The viewer upon receiving the confirmation may then navigate to another menu screen to terminate the process.

Figure 10:
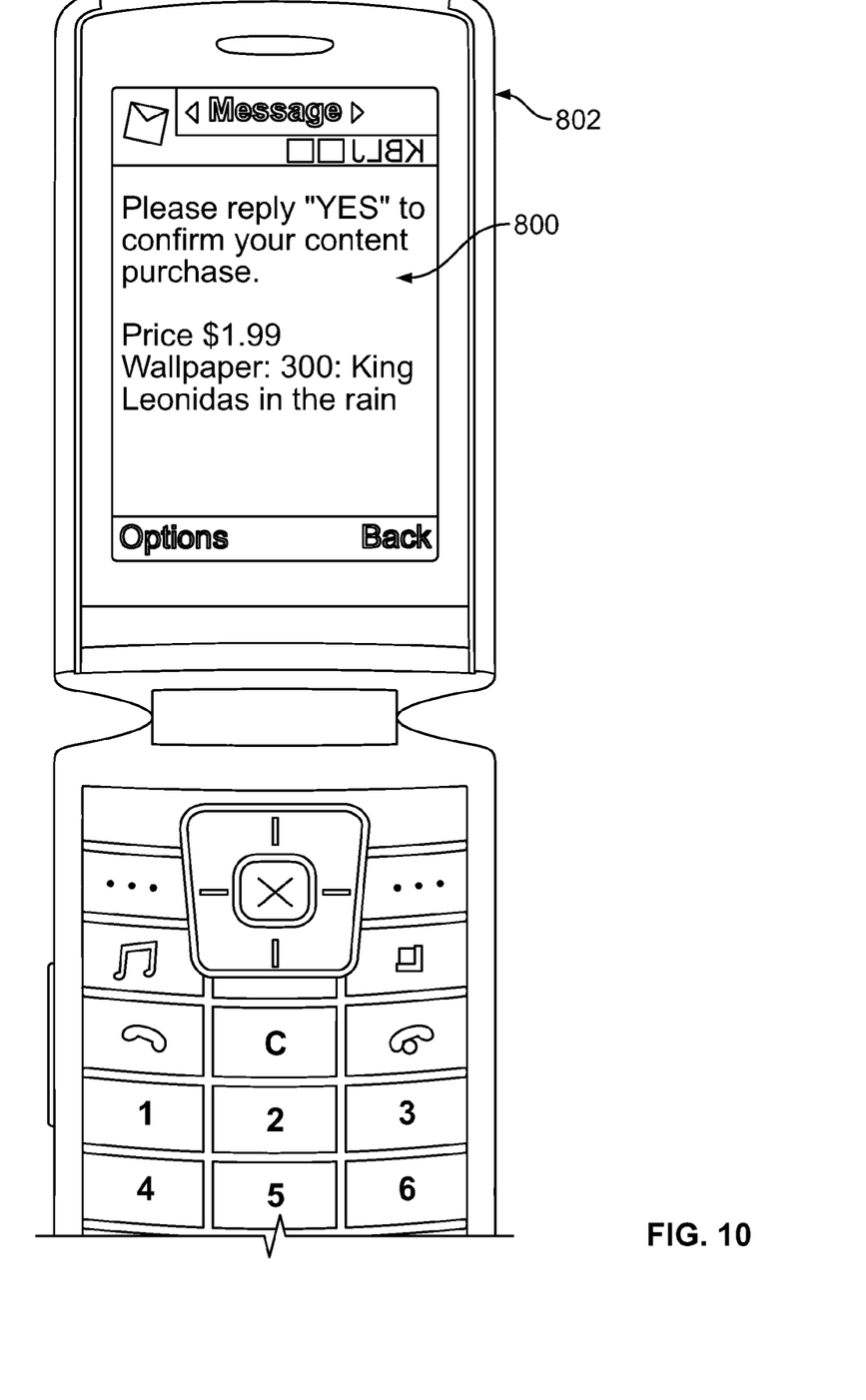
FIG. 10 is a screenshot showing an exemplary display of a mobile telephone displaying an MMS message from a second content server, requesting confirmation for purchase/receipt of the second content.

As previously described, the second content server may transmit a request for confirmation to the destination device before transmitting the content to it. FIG. 10 is a screenshot showing an exemplary display 800 of a mobile telephone 802 displaying an MMS message from a second content server, requesting confirmation for purchase/receipt of the second content.

Having thus described a preferred embodiment of a system and method for providing for distribution of second content to a remote device using first entertainment content operating on a specialized media player, it should be apparent to those skilled in the art that certain advantages of the within system have been achieved. It should also be appreciated that various modifications, adaptations, and alternative embodiments thereof may be made without departing from the scope and spirit of the present technology. For example, an application embedded in a HD DVD or Blu-ray disc has been described, but it should be apparent that the novel concepts described above may be applied by one of ordinary skill to forms of first digital content packages to thereby realize the benefits described herein.

What is claimed is:

1. A method comprising:

reading a digital medium encoded with digital audio-video first content and with an embedded application, using a media player device selected from an optical disc medium player or a set-top box, the media player device providing a video signal to a display device under control of a remote control device operated by a user;

executing the application using a processor of the media player device, wherein the application when executed causes the media player device to perform:
  (i) identifying second content that is not encoded on the optical medium in response to first input from the remote control device, wherein the second content consists essentially of prerecorded data stored on a remote server including at least one of digital audio, video, audio-video, or computer graphic data configured for output by a portable client device that is unable to play the first content in a same format as played by the media player device,
  (ii) outputting in the video signal a user interface responsive to user input from the remote control device, configured for enabling user input of an address of the portable client device using the remote control device,
  (iii) in response to second input from the remote control device via the user interface, determining the address of the portable client device by which the second content is to be sent to the portable client device, and
  (iv) transmitting an identifier for the second content and the address for the portable client device from the media player device to a remote server.

2. The method of claim 1, further comprising outputting the video signal generated from the digital audio-video first content from the media player device, wherein the video signal is configured to cause display of the first content on the display device.

3. The method of claim 1, wherein the digital audio-video first content and the embedded application are encoded on an optical medium and formatted according to the Blu-ray standard.

4. The method of claim 1, wherein executing the application enables determining the address comprising a telephone number.

5. The method of claim 1, wherein executing the application enables determining the address comprising an email address.

6. The method of claim 1, wherein executing the application is performed in response to selection of a link from a menu included in the digital audio-video first content.

7. A method comprising:

defining first digital content and an embedded application for encoding together on a data medium, wherein the embedded application is configured to operate on a media player device selected from an optical disc medium player or a set-top box for providing a video signal to a display device under control of a remote control device operated by a user, capable of playing the first digital content and capable of executing the application to generate a request for second digital content in response to input from a remote control device, and wherein the second digital content is not encoded on the data medium and consists essentially of prerecorded data stored on a remote server including at least one of digital audio, video, audio-video, or computer graphic data configured for output by a designated receiving device that is unable to play the first digital content in a same format as encoded on the data medium;

including in the embedded application a function generating a user interface responsive to user input from the remote control device, the user interface configured for enabling user input of an address of the designated receiving device receiving the second digital content in response to second input from the remote control device; and transmitting the second content to the designated receiving device in response to receiving the request for second content at a server remote from the media player device.

8. The method of claim 7, further comprising formatting the second content for designated receiving device.

9. The method of claim 7, further comprising storing the second digital content in a network-connected computer memory device remote from the media player device.

10. The method of claim 7, further comprising transmitting a confirmation request from the remote server to the designated receiving device prior to transmitting the digital second content to the designated receiving device.

11. The method of claim 10, further comprising receiving a confirmation message from the designated receiving device in response to transmitting the confirmation request.

12. The method of claim 11, wherein transmitting the digital second content to the designated receiving device is conditioned upon receiving the confirmation message from the designated receiving device.

13. The method of claim 7, further comprising receiving payment information at the remote server from the designated receiving device, the payment information authorizing a charge to a designated payment account.

14. The method of claim 13, wherein transmitting the digital second content to the designated receiving device is conditioned upon receiving the payment information from the designated receiving device.

15. The method of claim 7, wherein defining the first digital content and the embedded application further comprises formatting the first digital content and the embedded application for encoding on an optical disc.

16. The method of claim 7, wherein defining the first digital content and the embedded application further comprises formatting the first digital content and the embedded application for a Blu-ray player.

17. A media player, comprising:

a media reader selected from an optical disc medium player or a set-top box, the media reader configured for providing a video signal from a medium encoded with digital audio-video content and with an embedded application to a display device under control of a remote control device operated by a user; and a processor executing the embedded application to perform
  (i) identifying second content that is not encoded on the medium, in response to first input from the remote control device in communication with the media player, wherein the second content consists essentially of prerecorded data stored on a remote server including at least one of digital audio, video, audio-video, or computer graphic data configured for output by a portable client device that is unable to play the first content in a same format as played by the media player device,
  (ii) outputting in the video signal a user interface responsive to user input from the remote control device, that enables user input of an address of the portable client device using the remote control device, and (iii) in response to second input from the remote control device via the user interface, determining the address of the portable client device by which the second content is to be sent to the portable client device, and (iv) transmitting an identifier for the second content and the address for the portable client device from the media reader to a remote server.

18. The media player of claim 17, wherein the media reader is configured to read media formatted according to the Blu-ray standard.

19. The media player of claim 17, wherein the processor executing the application performs determining the address comprising a telephone number.

20. The media player of claim 17, wherein the processor executing the application performs determining the address comprising an email address.

21. A system comprising:
a media player device selected from an optical disc medium player or a set-top box playing a data medium having encoded thereon first digital content and an embedded application under control of a remote control device operated by a user, wherein the media player device plays the first digital content and executes the application to generate a user interface responsive to user input from the remote control device configured for enabling user input of an address of a designated receiving device, determines the address of the designated receiving device receiving second digital content and a request for the second digital content in response to the user input remote control device, and wherein the second digital content is not encoded on the data medium and consists essentially of prerecorded data stored on a remote server including at least one of digital audio, video, audio-video, or computer graphic data for use on the designated receiving device configured for output by the designated receiving device that is unable to play the first digital content in a same format as encoded on the data medium; and
a server remote from the media player device, transmitting the second content to the designated receiving device in response to receiving the request for second content.

22. The system of claim 21, further comprising the second content stored on a memory accessible to the server.

23. The system of claim 21, wherein the server is further configured for transmitting a confirmation request from the server to the designated receiving device prior to transmitting the digital second content to the designated receiving device.

24. The system of claim 23, wherein the server is further configured for receiving a confirmation message from the designated receiving device in response to transmitting the confirmation request.

25. The system of claim 21, wherein the server is further configured for transmitting the digital second content to the designated receiving device conditioned upon receiving the confirmation message from the designated receiving device.

26. The system of claim 21, wherein the server is further configured for receiving payment information from the designated receiving device, the payment information authorizing a charge to a designated payment account.

27. The system of claim 21, wherein the server is further configured for transmitting the digital second content to the designated receiving device conditioned upon receiving the payment information from the designated receiving device.

* * * * *